United States Patent
Galuten

(10) Patent No.: US 11,969,656 B2
(45) Date of Patent: Apr. 30, 2024

(54) DYNAMIC MUSIC CREATION IN GAMING

(71) Applicant: Sony Interactive Entertainment LLC, San Mateo, CA (US)

(72) Inventor: Albhy Galuten, Santa Monica, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 191 days.

(21) Appl. No.: 16/677,303

(22) Filed: Nov. 7, 2019

(65) Prior Publication Data

US 2020/0188790 A1 Jun. 18, 2020

Related U.S. Application Data

(60) Provisional application No. 62/768,045, filed on Nov. 15, 2018.

(51) Int. Cl.
| | |
|---|---|
| A63F 13/67 | (2014.01) |
| A63F 13/00 | (2014.01) |
| A63F 13/212 | (2014.01) |
| A63F 13/77 | (2014.01) |
| G10H 1/00 | (2006.01) |

(52) U.S. Cl.
CPC ............ *A63F 13/67* (2014.09); *A63F 13/00* (2013.01); *A63F 13/212* (2014.09); *A63F 13/77* (2014.09); *G10H 1/0025* (2013.01); *A63F 2300/1012* (2013.01); *A63F 2300/6027* (2013.01); *G10H 2210/026* (2013.01); *G10H 2210/111* (2013.01)

(58) Field of Classification Search
CPC ........ A63F 13/67; A63F 13/212; A63F 13/77; A63F 13/00; A63F 2300/1012; A63F 2300/6027; G10H 1/0025; G10H 2210/026; G10H 2210/111
See application file for complete search history.

(56) References Cited

U.S. PATENT DOCUMENTS

| | | |
|---|---|---|
| 5,451,709 A | 9/1995 | Minamitaka |
| 6,124,543 A | 9/2000 | Aoki |
| 9,583,084 B1 | 2/2017 | Fagan |
| 9,799,312 B1 | 10/2017 | Cabral et al. |
| 10,964,299 B1 | 3/2021 | Estes et al. |

(Continued)

FOREIGN PATENT DOCUMENTS

| | | |
|---|---|---|
| JP | 2006276854 A | 10/2006 |
| KR | 20180005277 A | 1/2018 |

(Continued)

OTHER PUBLICATIONS

International Search Report and Written Opinion dated Jan. 29, 2020 for International Patent Application No. PCT/US2019/060306.

(Continued)

*Primary Examiner* — Jianchun Qin
(74) *Attorney, Agent, or Firm* — JDI PATENT; Joshua D. Isenberg; Robert Pullman

(57) ABSTRACT

A method and system for dynamic music creation is disclosed. An emotion is assigned to one or more musical motifs and a game vector is associated with the emotion. The one or more musical motifs are mapped to the game vector based on the emotion. A musical composition is generated based on the game vector and desired emotions.

20 Claims, 13 Drawing Sheets

(56) References Cited

U.S. PATENT DOCUMENTS

| | | |
|---|---|---|
| 2001/0007542 A1 | 7/2001 | Fukuda |
| 2003/0128825 A1 | 7/2003 | Loudermilk |
| 2003/0167907 A1 | 9/2003 | Annen |
| 2007/0044639 A1 | 3/2007 | Farbood et al. |
| 2008/0141850 A1 | 6/2008 | Cope |
| 2009/0304207 A1 | 12/2009 | Cooper |
| 2010/0257993 A1* | 10/2010 | Brow .............. A63F 13/245 84/478 |
| 2010/0307320 A1* | 12/2010 | Hoeberechts ........ G10H 1/368 84/600 |
| 2012/0047447 A1 | 2/2012 | Haq |
| 2013/0025435 A1 | 1/2013 | Rutledge et al. |
| 2014/0058735 A1 | 2/2014 | Sharp |
| 2014/0076126 A1 | 3/2014 | Terry |
| 2014/0171195 A1* | 6/2014 | Searchfield .......... A63F 13/80 463/31 |
| 2014/0180674 A1 | 6/2014 | Neuhauser et al. |
| 2016/0253915 A1* | 9/2016 | Lee .................. G10H 1/0008 84/609 |
| 2017/0092247 A1 | 3/2017 | Silverstein |
| 2017/0228745 A1* | 8/2017 | Garcia .............. G06Q 30/0203 |
| 2017/0365277 A1 | 12/2017 | Park |
| 2018/0226063 A1 | 8/2018 | Wood et al. |
| 2018/0280802 A1* | 10/2018 | Stroud ................ A63F 13/67 |
| 2019/0237051 A1 | 8/2019 | Silverstein |
| 2020/0005744 A1 | 1/2020 | Godunov |
| 2020/0074877 A1 | 3/2020 | Marradi |
| 2020/0105292 A1* | 4/2020 | Large ................ A63J 17/00 |
| 2020/0138356 A1* | 5/2020 | Sharon ............. A61B 5/0205 |
| 2020/0312287 A1 | 10/2020 | Galuten |
| 2020/0380940 A1 | 12/2020 | Abdallah et al. |
| 2021/0043177 A1 | 2/2021 | Bar-Or et al. |
| 2021/0201863 A1 | 7/2021 | Vicente et al. |

FOREIGN PATENT DOCUMENTS

| | | |
|---|---|---|
| WO | 2004025306 A1 | 3/2004 |
| WO | 2007043679 A1 | 4/2007 |

OTHER PUBLICATIONS

Kim et al. "Music Emotion Recognition: a State of the Art Review"; 11th International Society for Music Information Retrieval converence; Publication [online]. 2010 [retrieved Jan. 13, 2020]. Retrieved from the Internet:; pp. 255-266.

International Search Report and Written Opinion dated Jun. 21, 2021 for International Patent Application No. PCT/US2021/025371.

Non-Final Office Action for U.S. Appl. No. 16/838,775, dated Oct. 28, 2021.

Extended European Search Report for European Application. 19884029.0, dated Jul. 1, 2022.

Japanese Office Action for Country Code Application No. 2021-526653, dated Apr. 28, 2022.

Japanese Final Reasons for Refusal for Application No. 2021-526653, dated Sep. 21, 2022.

Non-final Office Action dated Feb. 28, 2024 for U.S. Appl. No. 17/737,905.

\* cited by examiner

Figure 3

- 301 → Articles
- 302 → Reviews
- 303 → Blogs
- 304 → Podcasts
- 305 → Liner Notes
- 306 → Social Media
- 307 → Corpus of Musical Performances
- 308 → Map to specific Performances and Recordings (Including specific locations within performances)
- 309 → Map against Time Period of the Performance & Composition
- 310 → Structural Musical Analysis
- 311 → Map Emotional Key Words to Performances and Segments
- 312 → Corpus of Annotated Performance Data

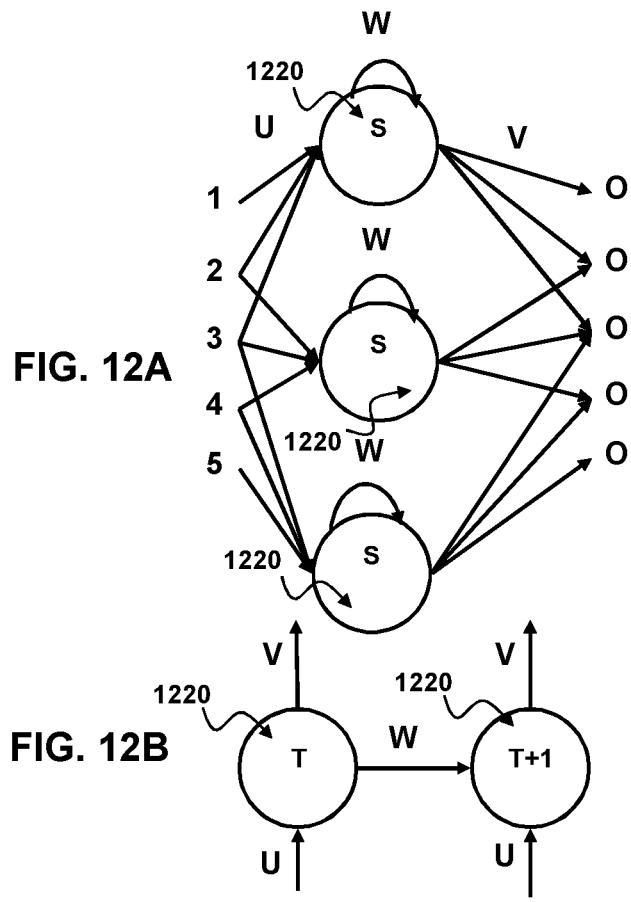
FIG. 12A
FIG. 12B
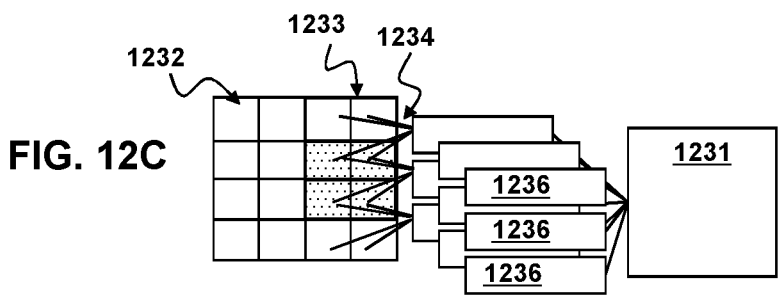
FIG. 12C

DYNAMIC MUSIC CREATION IN GAMING

FIELD OF THE DISCLOSURE

The present disclosure relates to the fields of music composition, music orchestration, machine learning, game design and psychological mapping of emotions.

BACKGROUND OF THE INVENTION

Gaming has always been a dynamic pursuit with game play responding to the actions of the players. As games become more cinematic and more immersive, music continues to grow in importance. Currently, music in games is mostly created from pre-written snippets (usually pre-recorded) that are pieced together like puzzle pieces. Occasionally they are slowed down, sped up, pitch transposed and often overlain on top of each other. A composer can guess about likely paths through gameplay but because it is interactive, much of it is unpredictable—certainly, the timing of most sections is rarely predictable.

In parallel Machine Learning and Artificial Intelligence have been making it possible to generate content based on training sets of existing content as labeled by human reviewers. Additionally, there is a large corpus of review data and emotional mapping to various forms of artistic expression.

As one further element, we are learning more and more about the players that participate in the game. Players who have opted in can be tracked on social media, analysis about their personalities can be made based on their behavior and as more and more users take advantage of biometric devices which track them (electrodermal activity, pulse and respiration, body temperature, blood pressure, brain wave activity, genetic predispositions, etc.), environmental customization can be applied to musical environments.

SUMMARY OF THE DISCLOSURE

The present disclosure describes a mechanism for analyzing music, separating out its musical components (rhythms, time signature, melodic structure, modality, harmonic structure, harmonic density, rhythmic density and timbral density) mapping those components to emotional components individually and in combination, based on published reviews and social media expressing human opinions about concerts, records, etc. This is done at both a macro and micro level within the musical works. Based on this training set, faders (or virtual faders in software) are given emotional components like Tension, Power, Joy, Wonder, Tenderness, Transcendence, Peacefulness, Nostalgia, Sadness, Sensuality, Fear, etc. These Musical Components are mapped against motifs which have been created for individual elements/participants of the game including but not limited to Characters (Lead Person, Partner, Primary Enemy, Wizard, etc.), Activity Types (fighting, resting, planning, hiding etc.), Areas (forest, city, desert, etc.), Personality of the person playing the game, etc. The motifs can be melodic, harmonic, rhythmic, etc. Once the composer has created the motifs and assigned the expected emotions to the faders, game simulations can be run where the composer selects motif combinations and emotional mappings and applies them to various simulations. These simulations can be described a priori or generated using a similar algorithm to map the game to similar emotional environments. It is possible that actual physical faders (as used in computerized audio mixing consoles) will make the process of mapping emotions to scenarios much more intuitive and visceral and that the physicality will create serendipitous results (e.g. raising the sensuality folder might have a better and more interesting effect than raising the tension fader even though it is a tense environment).

BRIEF DESCRIPTION OF THE DRAWING FIGURES

The above and still further objects, features and advantages of the present invention will become apparent upon consideration of the following detailed description of some specific embodiments thereof, especially when taken in conjunction with the accompanying drawings wherein like reference numerals in the various figures are utilized to designate like components, and wherein:

FIG. 3 is a block diagram depicting the collection and analysis of reviews and commentaries used to generate a corpus of annotated performance data according to aspects of the present disclosure.

FIG. 12A is a simplified node diagram of a recurrent neural network for use in dynamic music creation in gaming according to aspects of the present disclosure.

FIG. 12B is a simplified node diagram of an unfolded recurrent neural network for use in dynamic music creation in gaming according to aspects of the present disclosure.

FIG. 12C is a simplified diagram of a convolutional neural network for use in dynamic music creation in gaming according to aspects of the present disclosure.

DETAILED DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Component Overview

Figure 1:
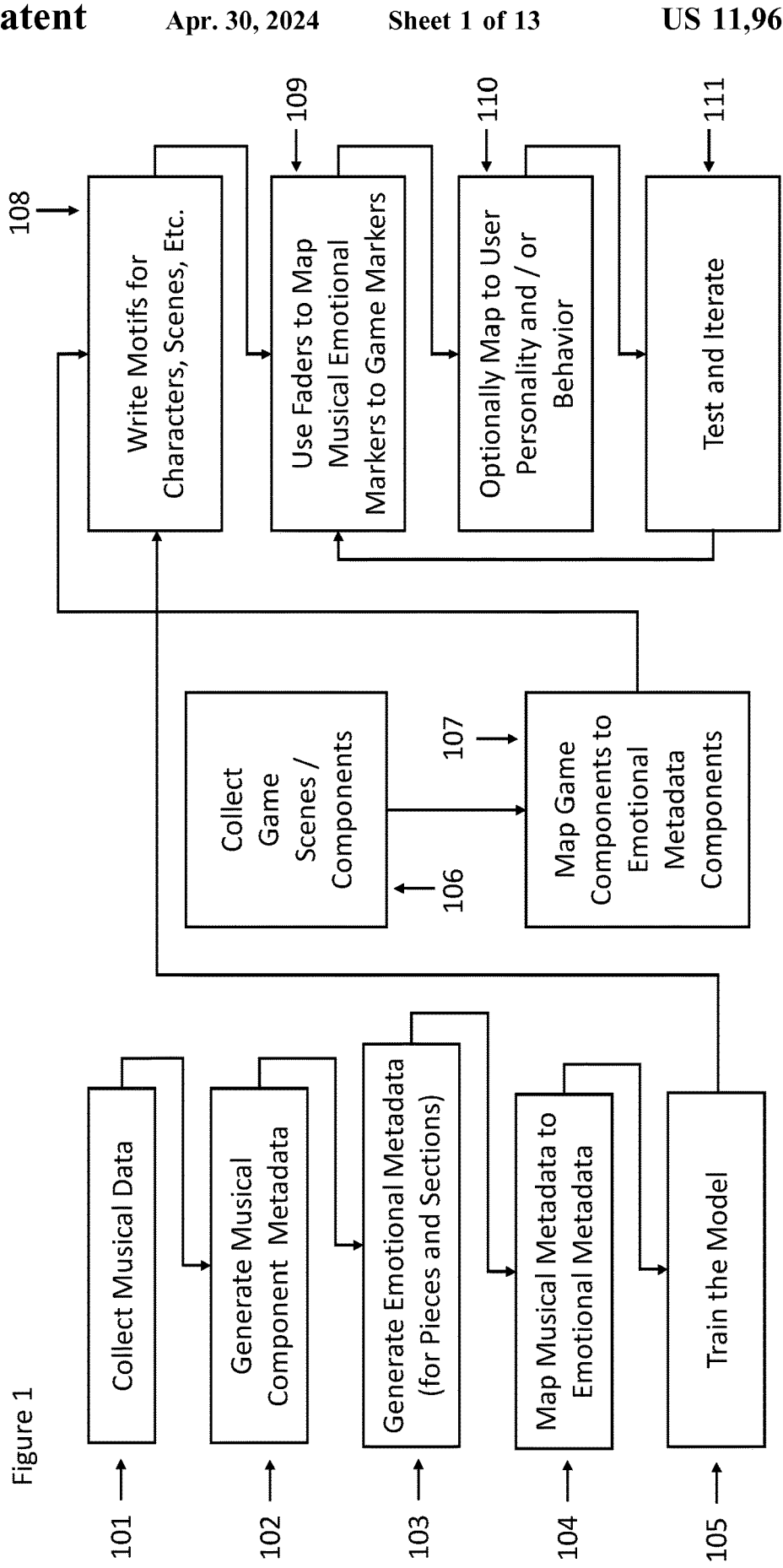
FIG. 1 is a block diagram depicting an overview of the Dynamic Music Creation Architecture according to aspects of the present disclosure.

As can be seen in FIG. 1, there are a number of components that comprise the complete system. Details will follow but it is useful to see the complete system from a high level. The components break down as follows:

First, the musical emotional data must be constructed: Musical Data can be collected from a corpus of written and recorded music 101. This can be scores, transcriptions created by people or transcriptions created intelligent software systems. Next, the system has to break the musical data into its individual components—melodies, harmonies, rhythms, etc. 102 and these must be stored as metadata associated with pieces or parts of pieces. Now, in order to determine the emotional components or markers associated with the individual musical elements, we will rely on the wisdom of the crowds. This is accurate, by definition, because it is people's emotions in relation to the music that we are trying to capture. We will use reviews, blog posts, liner notes and other forms of commentary to generate emotional metadata for whole pieces and individual sections 103. The next step is to map musical metadata to emotional metadata 104. At this point, we will have a fairly large corpus of musical data that is associated with emotional data but it will by no means be complete. The next step is to use a convolutional neural network (CNN) to compare the actual music metadata with the analysis of the emotional components 105. This CNN can then be used to suggest emotional associations for music that the model has not previously been trained on. This can then be checked for accuracy. Review and repeat—as iteration continues, accuracy will improve.

The next step is to analyze the gaming environment. The phases, components emotions and characteristics of the game must first be collected and mapped. These scenes and components include things like locales, characters, environments, verbs like fights, casting spells, etc. 106. The next step is to map game components to the emotional metadata components 107.

Once the gaming environment is mapped out, it is time to write the musical motifs 108. Motifs can be written for all of the key characters, for scenes, for moods or for any recurring element of the game. Once the basic motifs are written, faders (virtual or real) can be used to map musical emotional markers to game markers 109. The personality or behavioral components of the user (player of the game) can also be mapped as additional emotional characteristics to be considered 110. Next, continued testing, review and iteration are done try the model on different scenarios in the game under development 111.

What follows is a more detailed description of the various processes.

Analysis of Musical Components

Figure 2:
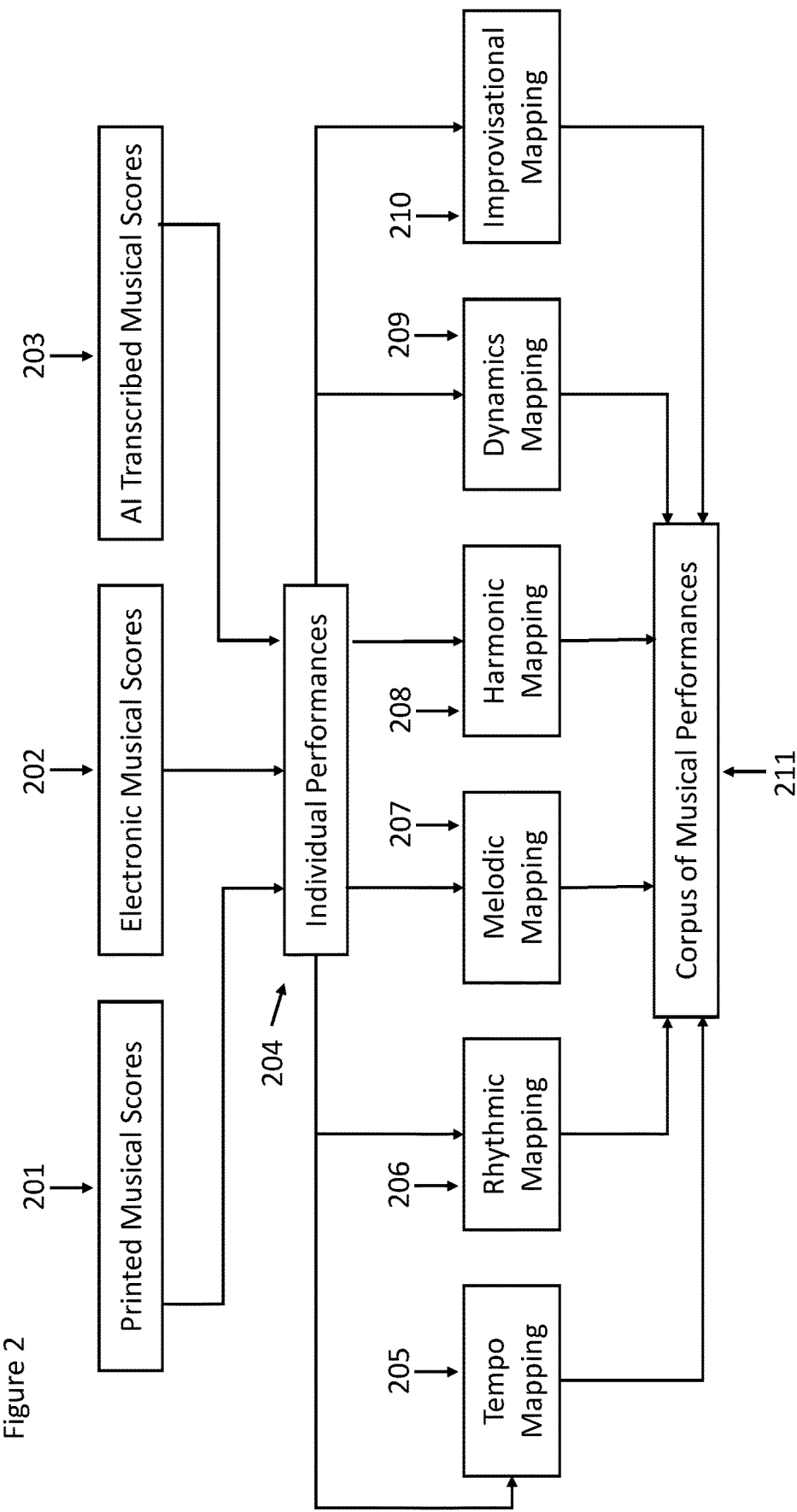
FIG. 2 is a block diagram showing the collection and an analysis of musical elements used to generate a corpus of musical elements according to aspects of the present disclosure.

There are a few elements required to do an analysis of musical components. These are outlined in FIG. 2. First, there is a large corpus of musical scores. Scores are available in printed form 201. These printed scores can be scanned and analyzed to be converted into electronic versions of the scores. Any form of electronic scoring can be used (MIDI, Sibelius, etc.). There are also scores already available in digital form 202, which can be added to the corpus. Finally, we can use machine learning to transcribe music into its musical elements (including the scores) 203. Machine Learning approaches can generate scores for music that may not be in notation form. This will include multiple versions of the same song by the same artist. Analyses of live and recorded performances have the advantage that they can be mapped in greater detail including things like variations in tempo and in dynamics—and for improvisational material many additional variables can be considered. We must keep track of the analyses of different performances 204 so that we can know the differences between performances—e.g. the NY Philharmonic performance of Beethoven's $5^{th}$ symphony conducted by Leonard Bernstein in 1964 would be different from Seiji Ozawa's performance of the same piece with the Boston Symphony years later. These scores have to be analyzed for tempo 205, rhythmic components 206, melody 207 harmonic structure 208, dynamics 209, harmonic and improvisational elements 210. All of this is now stored in a detailed corpus of musical performances 211.

Once there are deep mechanical analyses of a large corpus of music, these analyses are then mapped to reviews of those pieces using descriptions from reviews and analyses in literature about the pieces. This can be seen in FIG. 3. The reviews and analyses could be in textual, aural or visual form and include but not be limited to Articles 301, Reviews 302, Blogs 303, Podcasts 304, Liner Notes 305 and Social Media Comments 306. From this large corpus of musical analysis 307, will come descriptions of various pieces and sections of pieces 308. Further, these analyses must have context for the period in which they were written and performed 309. For example, one may look at the work of Mozart and read the descriptions in the literature of his work (which may be different periods e.g. a Mozart piece performed in the $20^{th}$ century). Next, a known structural musical analysis 310 is applied to determine which pieces and/or sections of pieces or melodic phrases are beautiful, heroic, melancholy, strident, plaintive, solemn, powerful, expressive, etc. This may involve looking at the music literature and apply general principles of compositional development to the analysis. For example, a melodic leap followed by stepwise reverse of direction is considered beautiful. Melodic intervals can be associated along a scale of pleasing, unpleasing or neutral (e.g., a jump of a minor $9^{th}$ is unpleasant, a fifth is heroic and a step within the key signature is neutral). All of this performance and compositional data may be used to Map Emotional Key Words to Performances and Segments 311.

"Emotion" words may come out of the process of digitally parsing the reviews and may include, and any manual analysis will almost certainly, include the words: Tension, Power, Joy, Wonder, Tenderness, Transcendence, Peacefulness, Nostalgia, Sadness, and Sensuality.

Note that for the keywords to work, it is not necessarily important that they be accurate only that they have a consistent effect. When actually using the final system, it will not matter if the fader associated with the word sensuality actually creates music that is more sensual but only that it is predictable and emotionally understandable to the composer. This is for two reasons: 1) the labels can always be changed to something more intuitive and 2) humans are adaptable when working with music and sounds (in the history of music synthesizers, the knobs, buttons and faders—for example—going back to the Yamaha DX-7 did not affect the sound in any way that was intuitive based on the name but rather had an affect that became part of the musician's sense memory and muscle memory and so was easy to use in spite of the meaningless labeling).

This detailed analysis of musical pieces and components is placed into a Corpus of Annotated Performance Data 312.

Note that mapping the musical elements to create a corpus of musical performances need not be, and will not likely be, a one to one mapping but will rather be set on a scale of an emotional continuum, e.g., a set of musical vectors. For example, a piece might be 8 out of 10 on a scale of sensuality and also 4 out of 10 on a scale of sadness. Once musical elements are mapped to these emotional vectors the model can be tested on titles that are not in the training dataset. Humans can listen to the results and fine tune the model until it is more accurate. Ultimately, the model will get very accurate for a place in time. Different models can be run in different time frames to create 50s style horror music or $21^{st}$ century style horror music—remembering that the actual descriptors are not as important as the classification groupings (that is, what is mellow to one composer might be boring to another).

Note that the model can map not only the pieces and sections to emotional vectors but may also map the constituent melodies, rhythms and chord progressions to those same emotional vectors. At the same time, the machine learns melodic structures (like a melodic leap upward followed by a step downward is generally considered beautiful and a leap of a minor ninth is generally considered discordant, etc.).

Figure 4:
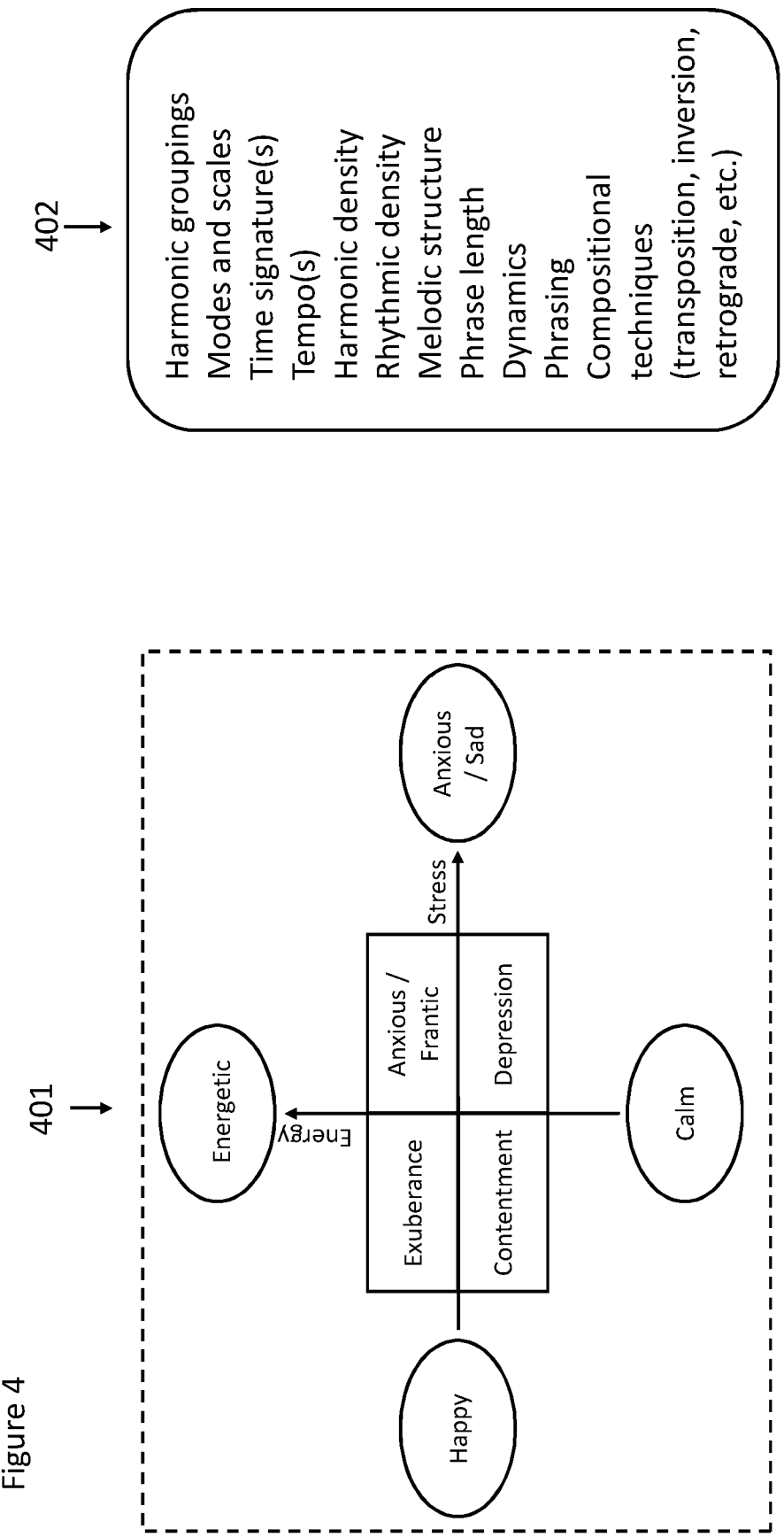
FIG. 4 is a representative depiction of an embodiment of emotional parameters of music according to aspects of the present disclosure.

The structural musical analysis 310 may involve a number of components. For example, as depicted in FIG. 4, beauty, dissonance and all measures of subjective description could be placed in time as a compositional reference. For example, what is considered dissonant in Bach's era (for example it was considered too dissonant to play the interval a major $7^{th}$ unless the $7^{th}$ was carried over from the previous more consonant chord) is considered beautiful in later eras (today a major seventh chord is considered normal and sometimes even sappy).

In one existing method of music mood classification 401, the moods of songs are divided according to psychologist Robert Thayer's traditional model of mood. The model divides songs along the lines of energy and stress, from happy to sad and calm to energetic, respectively. The eight categories created by Thayer's model include the extremes of the two lines as well as each of the possible intersections of the lines (e.g. happy-energetic or sad-calm).

This historic analysis may be of limited value and the approach described herein may be much more nuanced and flexible. Because of the size of the corpus and therefore the training dataset, a much richer and more nuanced analysis can be applied.

Some of the components to be analyzed 402 may include, but are not limited to, harmonic groupings, modes and scales, time signature(s), tempo(s), harmonic density, rhythmic density, melodic structure, phrase length (and structure), dynamics, phrasing and compositional techniques (transposition, inversion, retrograde, etc.), grooves (including rhythms like Funky, Lounge, Latin, Reggae, Swing, Tango, Merengue, Salsa, Fado, 60s disco, 70s disco, Heavy Metal, etc.—there are hundreds of established rhythmic styles)

Training the Model

Figure 5:
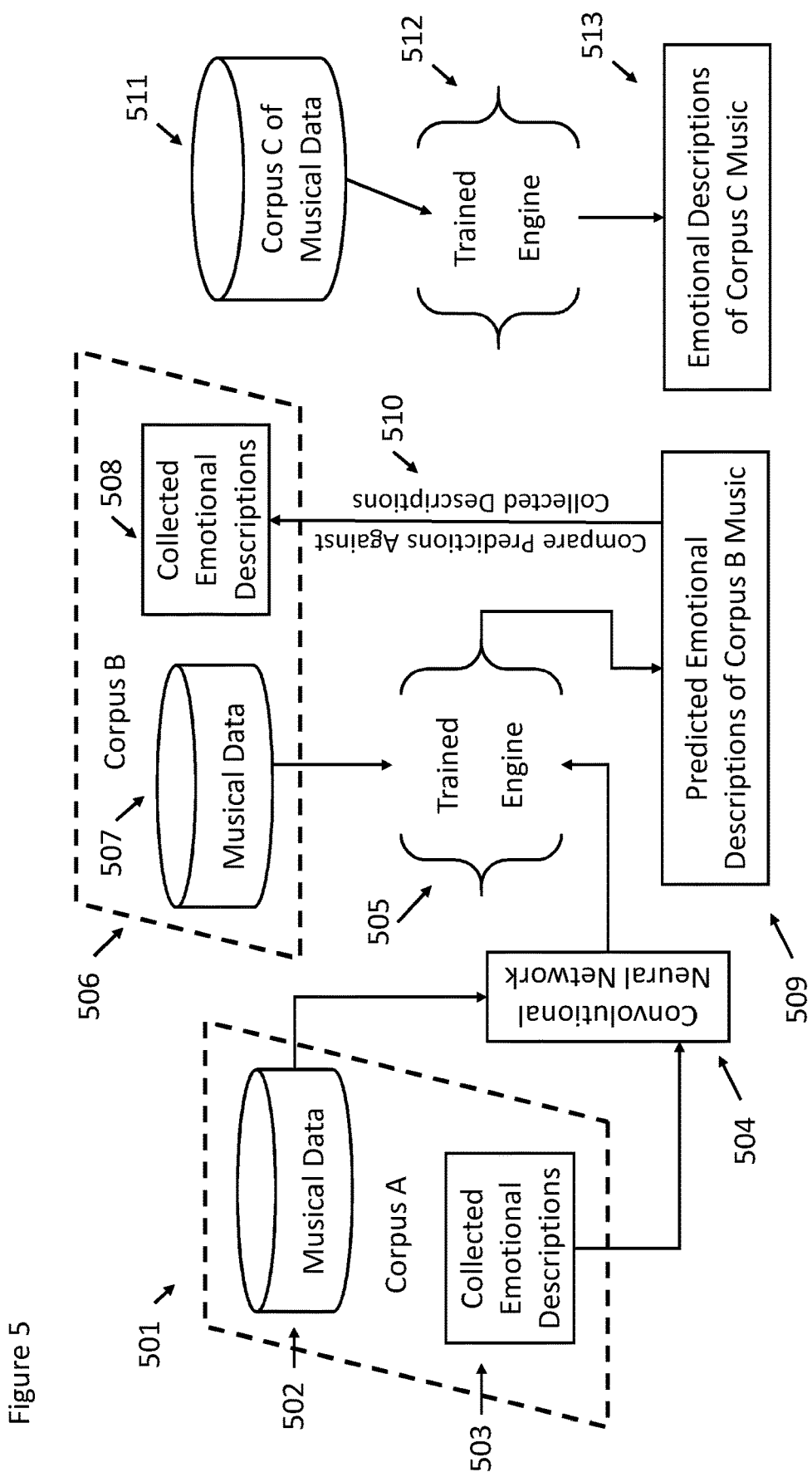
FIG. 5 is a systematic view of training of a model using the musical and emotional review elements according to aspects of the present disclosure.

Just as people would label photos of peaches to train a convolutional neural network to recognize a photo of a peach when it is shown a photo of a peach it has never seen before, the data about opinions of consumers and reviewers can be used to train a Machine Learning model and then use the model to classify new material. An example of this process is shown in FIG. 5. In the illustrated implementation, the wisdom of crowds (e.g., reviews, posts, etc.) may be used to train our model to recognize the emotions associated with different musical passages.

In the implementation shown in FIG. 5, the corpus of musical data into three buckets. The first bucket, Corpus A 501 is a set of musical data 502 for which the Collected Emotional Descriptions 503 have been mapped based on analysis of listener review data. The second bucket, Corpus B 506 is a set of musical data 507 for which its own set of Collected Emotional Descriptions 508 have been mapped. The third bucket, Corpus C is a set of Musical Data 511 for which there are no Collected Emotional Descriptions. The model is initially trained on Corpus A. Using a convolutional neural network 504 the Collected Emotional Descriptions 503 are mapped to the musical data 502. The results of this mapping is a Trained Engine 505, which should be capable of deriving Emotional Descriptions from Musical Data. The Musical Data 507 for Corpus B 506 it is then fed into the Trained Engine 505. The resultant output is the Predicted Emotional Descriptions of Corpus B Music 509. These predictions are then compared against Collected Descriptions 510 to determine how accurate the predictions are. This process of predicting, comparing and iterating (e.g. by moving the musical elements from Corpus B into Corpus A and repeating) continue until the predicted emotional descriptions of Corpus B Music 509 closely match the actual results. This process can continue indefinitely with the system getting smarter and smarter over time. After the trained engine 505 has gone through enough iterations, it can be used as a prediction engine 512 on Corpus C 511 to predict the Emotional Descriptions of Corpus C Music 513.

Mapping the Game Elements

Figure 6:
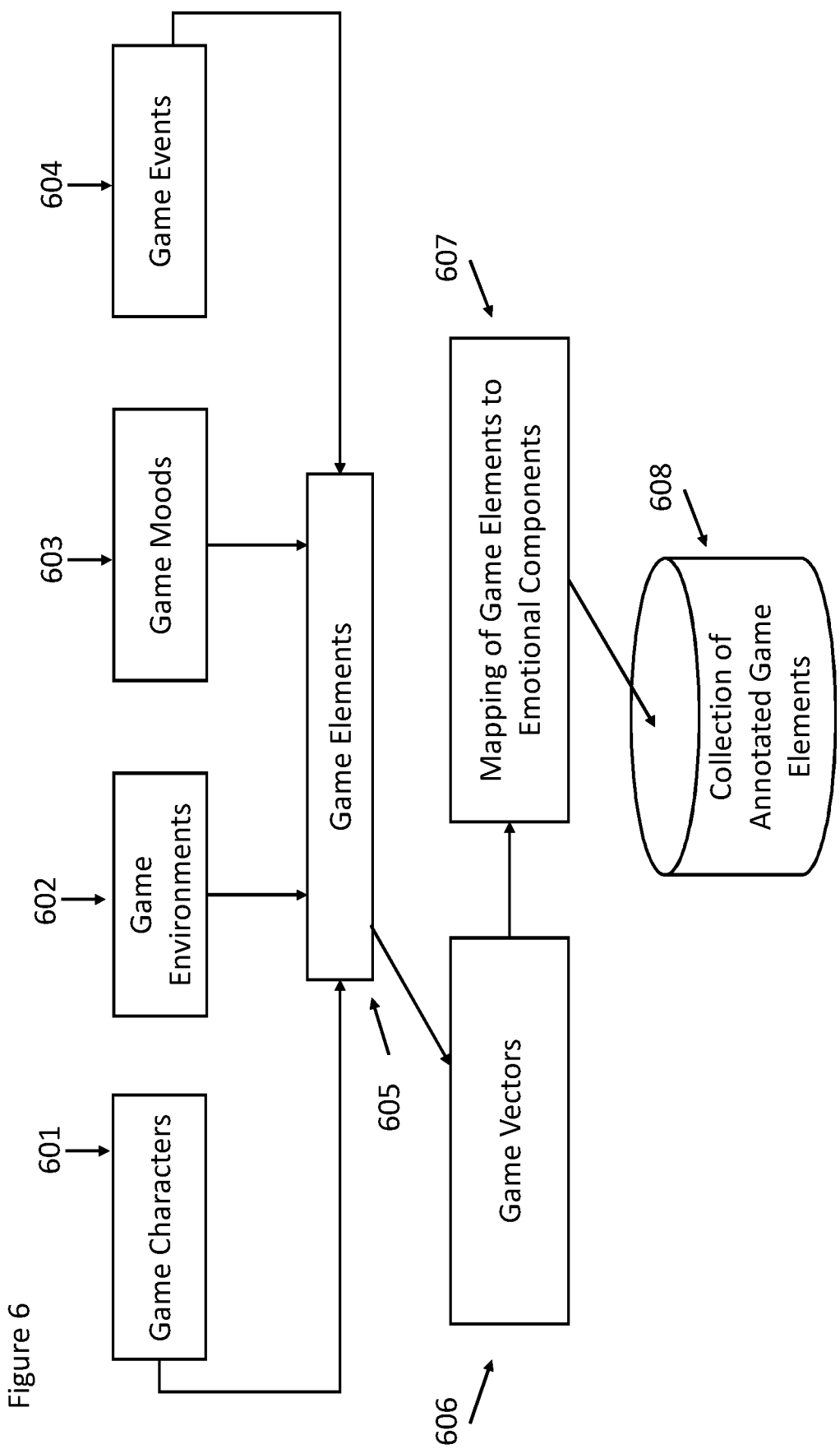
FIG. 6 is a block diagram of showing creation of an annotated collection of game elements according to aspects of the present disclosure.

To match dynamic musical elements to different elements in a game, a corpus of elements that may require music or changes in music may be created. There are many different elements that can have an impact on what the music should be at that moment. These elements are, of course, used by game developers and can be made available to the composer and sound designer in order for the music to be matched. As can be seen in FIG. 6, there are numerous game elements to be tracked and mapped. These include but are not limited to game characters 601, game environments or locations 602, game moods or tones 603 and perhaps most importantly, game events 604. Events in a game can be anything from the appearance of an enemy or friend to the change of a location to a battle to the casting of a spell to a race (and many, many more). All of these game elements 605 are collected along with their triggers (in or out) and modifiers. Additionally, these may be collected as game vectors 606. They are referred to as vectors because many of the components have multiple states. For example, a field might be different at night than in the daytime and different in the rain than in the sunshine. An enemy might have variable powers that increase or decrease based on time, place, or level. From this perspective, any element could have an array of vectors. All game elements and their vectors have moods associated with them. The mood may vary with the value of the vector but, nonetheless, moods can be associated with the game elements. Once we have mapped the game elements to their Emotions 607, we can store that relationship in a corpus or Collection of Annotated Game Elements 608.

Gathering the Components Needed to Feed the Environment

Ultimately, the compositional tools could be used to create music on its own from the game play but the focus of this embodiment is to create the music from compositional primitives. The composer will create musical elements or motifs and associate them with characters or elements in the game.

The use of the tools here need not be used alone and will often be used to augment traditional scoring techniques where prerecorded music is combined both sequentially and in layers with multiple components being mixed together to create a whole. That is, today, different layers may start in different time and some will overlap with others and still others may run independently of other layers. The idea here is to develop additional tools that can be used 1) in addition to (e.g. on top of) existing techniques, 2) instead of existing techniques in some or all places or 3) as a mechanism to inform the use of existing techniques. Additionally, these mechanisms could be used to create entirely new forms of interactive media (for example people trying to control their blood pressure or brain wave states could use musical feedback as a training tool or even use biometric markers as a compositional tool.

In traditional composition studies, motifs typically refer to small melodic segments. However, in this context motifs can be melodic segments, harmonic structures, rhythmic structures and or specific tonalities. Motifs can be created for as many of the individual elements/participants of the game as desired, including but not limited to characters (lead person, partner, primary enemy, wizard, etc.), activity types (fighting, resting, planning, hiding etc.), areas (forest, city, desert, etc.), personality of the person playing the game (young, old, male, female, introvert, extrovert, etc.). The motifs can be melodic, harmonic, rhythmic, etc. Additionally, there can be multiple motifs for an individual element, for example a rhythmic pattern and a melodic pattern that might be used individually or together or there might be both a sad motif and a happy motif for the same character to be used in different circumstances.

Once the composer has created the motifs, they can be assigned to the elements/characters. This could be done by the composer or sound designers and can be changed as the game is developed or even dynamically inside the game after it has been released.

Utilizing the Tools to Map the Musical Components to the Game Elements

The aforementioned aspects may be combined to map musical components to the game elements. It should be assumed throughout the document that reference to faders and buttons could be real physical buttons or faders or could be virtual buttons or faders. Intuitively, based on the experience of musicians and composers, it is expected that physical buttons and faders will be more intuitive to use and likely have better outcomes. It is possible, likely even, that actual physical faders (as used in computerized audio mixing consoles) will make the process of mapping emotions to scenarios much more intuitive and visceral and that the physicality will create serendipitous results (e.g. raising the sensuality folder might have a better and more interesting effect than raising the tension fader even though it is a tense environment). However, for the purposes of this application either may work.

Figure 7:
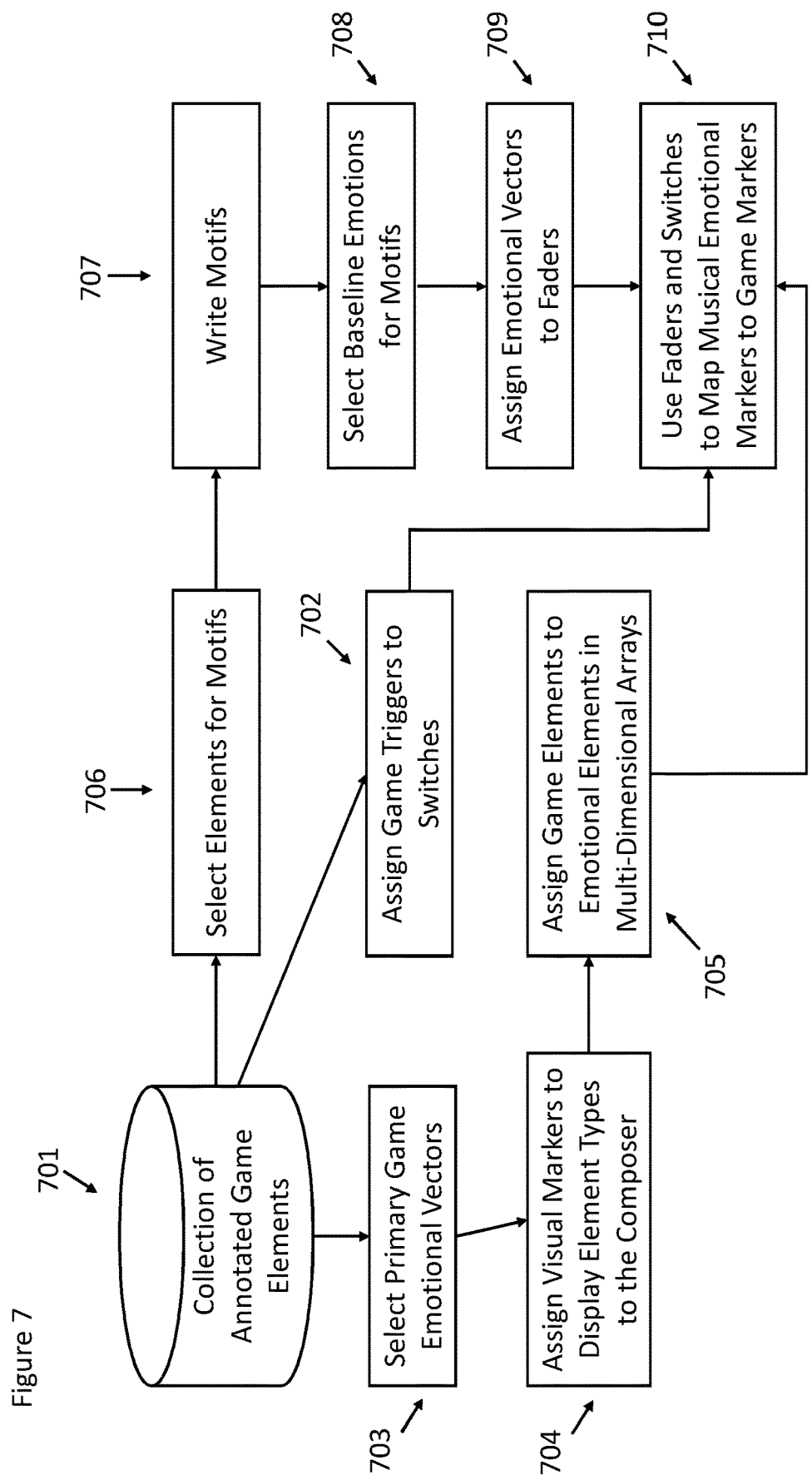
FIG. 7 is a block diagram showing the creation and mapping of musical elements against game elements using virtual or real faders according to aspects of the present disclosure.

An example of a possible logical order of events as shown in FIG. 7, though any order may yield results and the process will undoubtedly be iterative, recursive and non-linear.

The logical order depicted in FIG. 7 may begin with a Collection of Annotated Game Elements 701, which may be carried over from the Collection of Annotated Game Elements 608 in FIG. 6. Game triggers are then assigned to switches at 702. These triggers could be the appearance of an enemy or an obstacle or a level up, etc., etc., etc. Next, Primary Emotional Vectors 703 are selected and visual markers are assigned at 704 so that element types may be displayed to the Composer. Game elements are then assigned to emotional elements in multi-dimensional arrays, as indicated at 705. The multi-dimensional arrays are then assigned to faders and switches, which are used to map musical emotional markers to game markers at 710. Once a set of emotional markers for game elements has been established, music be applied to the game elements. The Composer writes the motifs 707. As noted above, the motifs can represent characters, events, areas or moods. Next, we select baseline emotions for motifs 708. These are the default emotions. For example, anytime a wizard appears, there might be a default motif with its default emotion. These can vary based on circumstance but if no variables are applied, they will operate in their default mode. Now we assign emotional vectors to faders 709. Now that the game vectors have been assigned and the musical vectors assigned, the faders and switches can be used to map musical emotional markers to game markers at 710. A fader does not have to correspond to a single emotion. As this is much like fine tuning the timbre of an instrument, the composer can be creative. Perhaps a fader that is to be 80% heroic and 20% sad will yield unexpected and delightful results.

Next, the various themes may be mapped to a set of buttons (perhaps in a colored matrix so it is easy to see many at once). Some of these may be the same as the game switches but others will be musical switches. These could be grouped by type of character (hero, villain, wizard, etc.), musical composition component (say grooves on one side and melodies on another, modes across the top) and scenes (city, country, etc.)

Note, many of the game triggers that have been mapped to the buttons or switches will eventually be "pushed" by the game play itself, but in the early stages it will be useful to be able to simulate things like the arrival of an enemy or a sunrise or impending doom.

Now, game simulations can be run in real time to early versions of the game, even if it is only storyboards or even if there are no storyboards just to write music that applies to different scenarios. The composer can select motif combinations and emotional mappings and applies them to various simulations and test drive them. As the game develops, these scenarios can be fine-tuned.

In fact, this can be used as a generalized composition too where a composer or performer can use the machine to create music based on primitives.

Using the Faders and Switches to Program the Music

Figure 8:
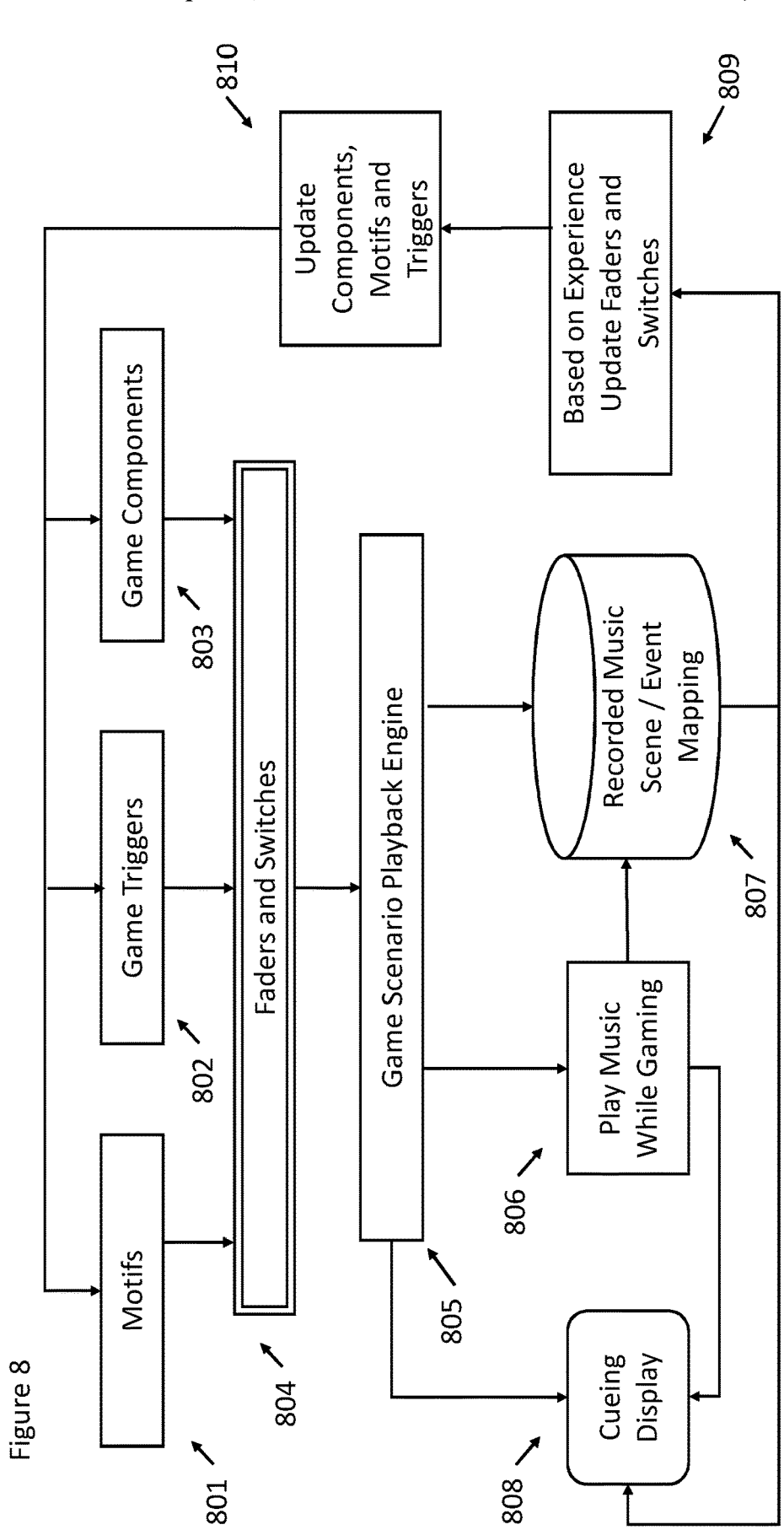
FIG. 8 is a block diagram depicting the interaction of Faders and Switches with the Game Scenario Playback Engine according to aspects of the present disclosure.

FIG. 8 illustrates an example of how game simulations and musical programming can actually be utilized. As was seen in FIG. 7 and can be seen in FIG. 8, motifs 801, game triggers 802 and game components 803 are mapped to faders and switches 804. These motifs 801, game triggers 802 and game components 803 mapped to faders and switches 804 are plugged into a game scenario playback engine 805. The composer now plays the music while testing various gaming scenarios 806 and it is recorded by a recorded music scene/event mapping module 808. In order to see what the elements are, the composer can look at a cuing display screen 808 showing what elements are being used or are coming up. If a fader is touched, the element to which it is mapped may be highlighted on the screen to provide visual feedback. The cuing display can show the elements from the game scenario playback engine 805, as they are playing out from the live faders and switches. This is represented by a play music while gaming module 806 and from the recorded music scene/event mapping module 807. Just like updating the faders while mixing with automated faders, all the faders and switches can be updated and modified in real time at 809 and remembered for later playback. Additionally, motifs, components and triggers can be updated at 810 and remembered by the system. Of course, there are unlimited undos and different performances can be saved as different versions, which can be used at different times and in combination with each other.

Figure 9:
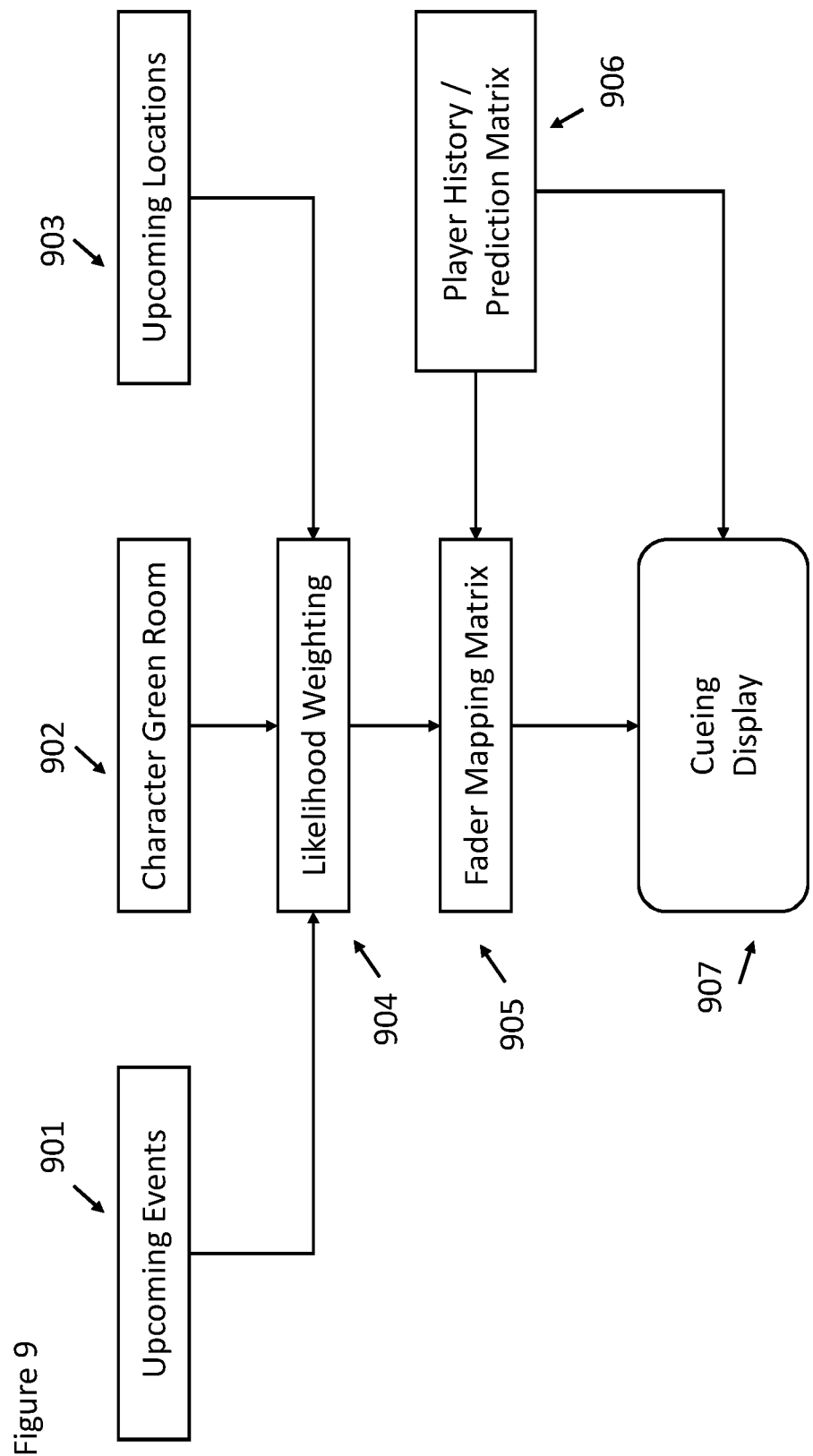
FIG. 9 is a block diagram showing how the cuing display is used in mapping the game and musical elements by previewing upcoming events according to aspects of the present disclosure.

FIG. 9 displays additional detail on how a Cuing Monitor 907 may be used according to aspects of the present disclosure. Upcoming events 901, character 902 and locations 903 can all be seen on the Cuing Monitor (there may be multiple Cuing Monitors). There may be a default weighting 904 based on the expected parameters of the game play. These and the Fader (and Switch) Mapping Matrix 905 are all displayed on one or more Cuing Monitors 907. One other input to the fader mapping matrix 905 and visible on a Cuing Monitor is the Player History/Prediction Matrix 906. Based on the player's style of play or other factors (time of day, number of minutes or hours in the current session, state of the game, etc.), this matrix can vary the music either automatically or based on parameters set by the composer or sound designer.

Music that Foreshadows a Change

In film, the music often changes before the visuals do. This process of presaging or foreshadowing is important for the emotional connection to the piece and to prepare the viewer/listener for a change in mood or to create other emotional preparation (even if it is a false prediction and the viewer is surprised). Now, as we are writing music on the fly, we will want to be able to foreshadow changes. This could be associated with being close to the completion of a level or signaling the entrance of a new character or environment (or setting up the viewer for one kind of change but actually surprising them with another kind of change).

Figure 10:
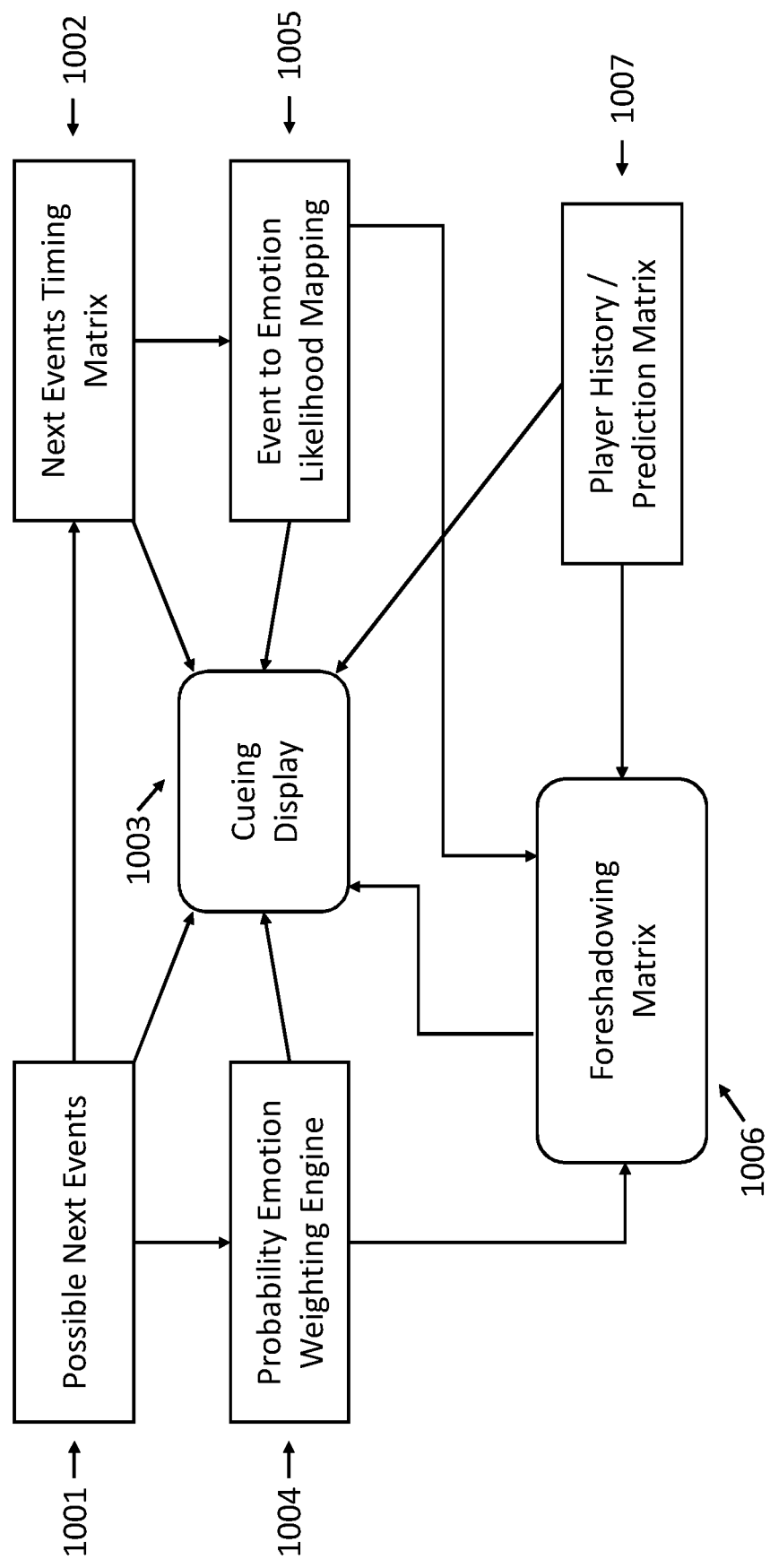
FIG. 10 is a block diagram of how foreshadowing is enabled using the cuing display to manage upcoming musical and gaming elements according to aspects of the present disclosure.

How will our Compositional Engine foreshadow effectively? We can use triggers that are known in advance and use faders or dials to control the timing of the foreshadowing and also the ramp of the foreshadowing. For example, if there is a timer running out on a level, the foreshadowing might be set to begin 30 seconds before the time ends and to rise in intensity using an exponential curve such as $y=2^x$. Many foreshadowings are possible from possible fear overtones to happy projections. Again, because, this is designed to be a visceral too, this functionality may well end up creating unanticipated results some of which will be useful to program into the game. Looking at FIG. 10, a set of Possible Next Events 1001 can be seen on the Cuing Matrix 1003. There is also a Next Events Timing Matrix 1002, which can be used to set the timing values and ramping characteristics. Another factor that can play into the Foreshadowing is the Probability Emotion Weighting Engine 1004. This Engine weighs the expected emotional state of the upcoming event and is used to effect the foreshadowing audio. It can be seen on the Cueing Monitor and the weighting of its effect can be varied. The likelihood of an upcoming event to have any particular emotion and the predicted intensity of that emotion is mapped by the Event to Emotion Likelihood Mapping Engine 1005. Foreshadowing is also affected by Player History and the Player History/Prediction Matrix 1007, This Matrix can be seen on the Cuing Monitor and also feeds into the Foreshadowing Matrix Engine 1006. Though all of the elements in FIG. 10 and be seen in the Cuing Monitor, they would likely be relegated to secondary Cuing Monitors as the Foreshadowing Matrix Engine will be using machine intelligence to surface the most likely scenarios. The visible components can be set in preferences or programmed but as material will be coming quickly (though, of course, the composer can have many takes), it would be best for the Learning Engine to automate as many of these components as possible.

Uses Outside of Games

The uses of this compositional tool are not limited to game use only. Interactive VR environments, even in non-game uses can take advantage of these techniques. Additionally, this could be used as a compositional too for scoring a traditional TV show or Film. And one final use might be to use this in the pure creation of music to create albums or beds for pop songs, etc.

System

Figure 11:
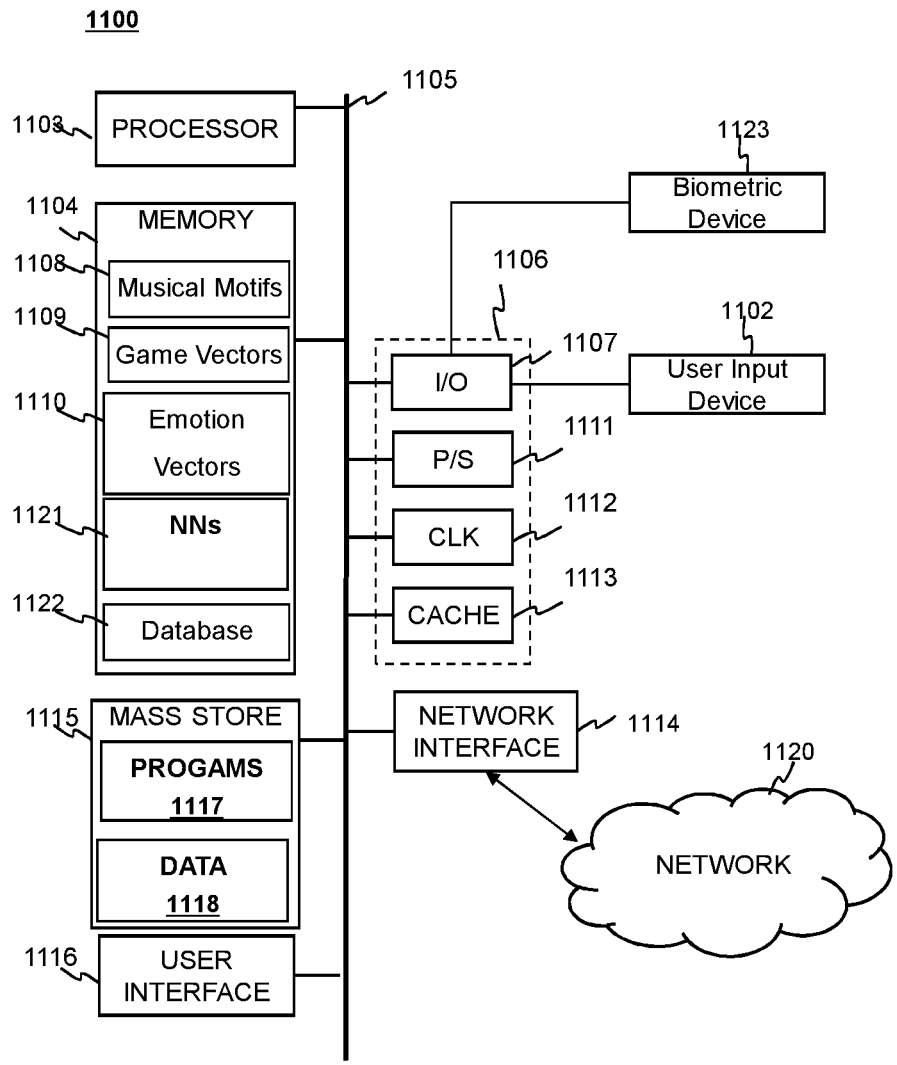
FIG. 11 depicts a block schematic diagram of a system for dynamic music creation in gaming according to aspects of the present disclosure.

FIG. 11 depicts a system for dynamic music creation in gaming according to aspects of the present disclosure. The system may include a computing device 1100 coupled to a user input device 1102. The user input device 1102 may be a controller, touch screen, microphone, keyboard, mouse, joystick, fader board or other device that allows the user to input information including sound data in to the system. The system may also be coupled to a biometric device 1123 configured to measure a electro-dermal activity, pulse and respiration, body temperature, blood pressure, or brain wave activity. The biometric device may be for example and without limitation a thermal or IR camera pointed at a user and configured to determine the respiration and heart rate of user from thermal signatures, for more information see commonly owned U.S. Pat. No. 8,638,364 to Chen et al. "USER INTERFACE SYSTEM AND METHOD USING THERMAL IMAGING" the contents of which are incorporated herein by reference. Alternatively, the biometric device may be such other devices as for example and without a limitation, a pulse oximeter, blood pressure cuff, electroencephalograph machine, electrocardiograph machine, wearable activity tracker or a smartwatch with bio-sensing.

The computing device 1100 may include one or more processor units 1103, which may be configured according to well-known architectures, such as, e.g., single-core, dual-core, quad-core, multi-core, processor-coprocessor, cell processor, and the like. The computing device may also include one or more memory units 1104 (e.g., random access memory (RAM), dynamic random access memory (DRAM), read-only memory (ROM), and the like).

The processor unit 1103 may execute one or more programs, portions of which may be stored in the memory 1104 and the processor 1103 may be operatively coupled to the memory, e.g., by accessing the memory via a data bus 1105. The programs may be configured to generate or use sound motifs 1108 to create music based on game vectors 1109 and emotion vectors 1110 of a videogame. The sound motifs may be short musical motifs composed by musicians, users or machines. Additionally the Memory 1104 may contain programs that implement training of a sound categorization and classification NNs 1121. The memory 1104 may also contain one or more databases 1122 of annotated performance data and emotional descriptions. Neural network modules 1121, e.g., convolutional neural networks for associating musical motifs with emotions may also be stored in the memory 1104. The memory 1104 may store a report 1110 lasting items not identified by the neural network modules 1121 as being in the databases 1122. The sound motifs, game vectors, emotional vectors, neural network modules and annotated performance data, 1108, 1109, 1121, 1122 may also be stored as data 1118 in the Mass Store 1118 or at a server coupled to the Network 1120 accessed through the network interface 1114. Additionally data for a videogame may be stored the memory 1104 as data in the database or elsewhere or as a program 1117 or data 1118 in the mass store 1115.

The overall structure and probabilities of the NNs may also be stored as data 1118 in the Mass Store 1115. The processor unit 1103 is further configured to execute one or more programs 1117 stored in the mass store 1115 or in memory 1104 which cause processor to carry out a method of dynamic music creation using musical motifs 1108, game vectors 1109 and emotional vectors 1110 as described herein. Music generated from the musical motifs may be stored in the database 1122. Additionally the processor may carry out the method for NN 1121 training and classification of musical motifs to emotions as described herein. The system 1100 may generate the Neural Networks 1122 as part of a NN training process and store them in memory 1104. Completed NNs may be stored in memory 1104 or as data 1118 in the mass store 1115. Additionally the NN 1121 may be trained using actual responses from users with the biometric device 1123 being used to provide biological feedback from the user.

The computing device 1100 may also include well-known support circuits, such as input/output (I/O) 1107, circuits, power supplies (P/S) 1111, a clock (CLK) 1112, and cache 1113, which may communicate with other components of the system, e.g., via the bus 1105. The computing device may include a network interface 1114. The processor unit 1103 and network interface 1114 may be configured to implement a local area network (LAN) or personal area network (PAN), via a suitable network protocol, e.g., Bluetooth, for a PAN. The computing device may optionally include a mass storage device 1115 such as a disk drive, CD-ROM drive, tape drive, flash memory, or the like, and the mass storage device may store programs and/or data. The computing device may also include a user interface 1116 to facilitate interaction between the system and a user. The user interface may include a monitor, Television screen, speakers, headphones or other devices that communicate information to the user.

The computing device 1100 may include a network interface 1114 to facilitate communication via an electronic communications network 1120. The network interface 1114 may be configured to implement wired or wireless communication over local area networks and wide area networks such as the Internet. The device 1100 may send and receive data and/or requests for files via one or more message packets over the network 1120. Message packets sent over the network 1120 may temporarily be stored in a buffer 1109 in memory 1104. The annotated performance data, sound motifs, and annotated game elements may be available through the network 1120 and stored partially in memory 1104 for use.

Neural Network Training

Generally, neural networks used in dynamic music generation may include one or more of several different types of neural networks and may have many different layers. By way of example and not by way of limitation the classification neural network may consist of one or multiple convolutional neural networks (CNN), recurrent neural networks (RNN) and/or dynamic neural networks (DNN).

FIG. 12A depicts the basic form of an RNN having a layer of nodes 1220, each of which is characterized by an activation function S, one input weight U, a recurrent hidden node transition weight W, and an output transition weight V. The activation function S may be any non-linear function known in the art and is not limited to the (hyperbolic tangent (tanh) function. For example, the activation function S may be a Sigmoid or ReLu function. Unlike other types of neural networks, RNNs have one set of activation functions and weights for the entire layer. As shown in FIG. 12B the RNN may be considered as a series of nodes 1220 having the same activation function moving through time T and T+1. Thus, the RNN maintains historical information by feeding the result from a previous time T to a current time T+1.

In some embodiments, a convolutional RNN may be used. Another type of RNN that may be used is a Long Short-Term Memory (LSTM) Neural Network which adds a memory block in a RNN node with input gate activation function, output gate activation function and forget gate activation function resulting in a gating memory that allows the network to retain some information for a longer period of time as described by Hochreiter & Schmidhuber "Long Short-term memory" Neural Computation 9(8):1735-1780 (1997), which is incorporated herein by reference.

FIG. 12C depicts an example layout of a convolution neural network such as a CRNN according to aspects of the present disclosure. In this depiction, the convolution neural network is generated for training data in the form of an array 1232, e.g., with 4 rows and 4 columns giving a total of 16 elements. The depicted convolutional neural network has a filter 1233 size of 2 rows by 2 columns with a skip value of 1 and a channel 1236 of size 9. For clarity in FIG. 12C only the connections 1234 between the first column of channels and their filter windows is depicted. Aspects of the present disclosure, however, are not limited to such implementations. According to aspects of the present disclosure, the convolutional neural network that implements the classification 1229 may have any number of additional neural network node layers 1231 and may include such layer types as additional convolutional layers, fully connected layers, pooling layers, max pooling layers, local contrast normalization layers, etc. of any size.

Figure 12D:
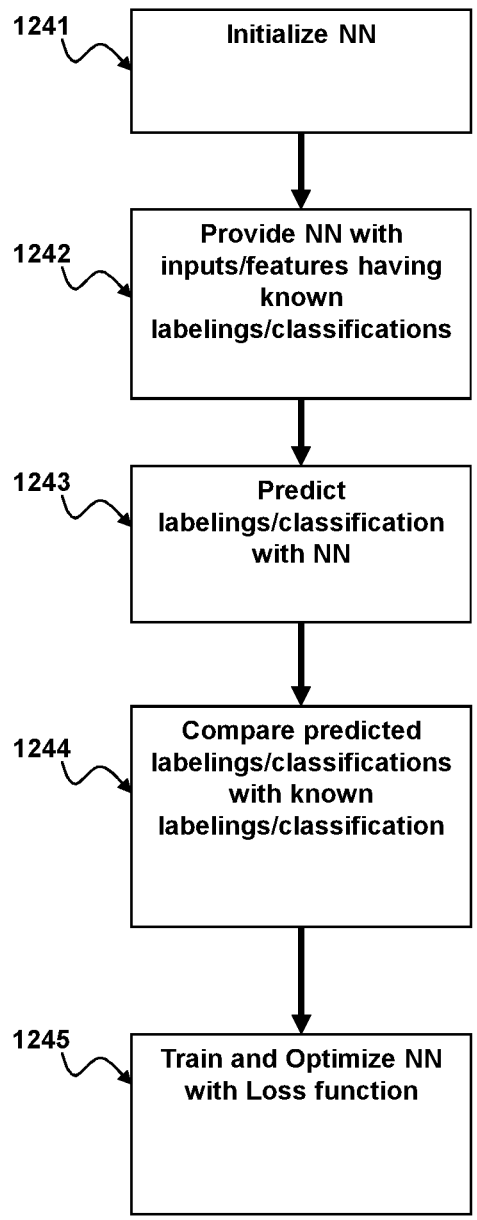
FIG. 12D is a block diagram of a method for training a neural network in dynamic music creation in gaming according to aspects of the present disclosure.

As seen in FIG. 12D Training a neural network (NN) begins with initialization of the weights of the NN 1241. In general, the initial weights should be distributed randomly. For example, an NN with a tanh activation function should have random values distributed between $$-\frac{1}{\sqrt{n}} \text{ and } \frac{1}{\sqrt{n}}$$

where n is the number of inputs to the node.

After initialization the activation function and optimizer is defined. The NN is then provided with a feature vector or input dataset 1242. Each of the different features vectors may be generated by the NN from inputs that have known labels. Similarly, the NN may be provided with feature vectors that correspond to inputs having known labeling or classification. The NN then predicts a label or classification for the feature or input 1243. The predicted label or class is compared to the known label or class (also known as ground truth) and a loss function measures the total error between the predictions and ground truth over all the training samples 1244. By way of example and not by way of limitation the loss function may be a cross entropy loss function, quadratic cost, triplet contrastive function, exponential cost, etc. Multiple different loss functions may be used depending on the purpose. By way of example and not by way of limitation, for training classifiers a cross entropy loss function may be used whereas for learning pre-trained embedding a triplet contrastive function may be employed. The NN is then optimized and trained, using the result of the loss function and using known methods of training for neural networks such as backpropagation with adaptive gradient descent etc. 1245. In each training epoch, the optimizer tries to choose the model parameters (i.e., weights) that minimize the training loss function (i.e. total error). Data is partitioned into training, validation, and test samples.

During training, the Optimizer minimizes the loss function on the training samples. After each training epoch, the mode is evaluated on the validation sample by computing the validation loss and accuracy. If there is no significant change, training can be stopped and the resulting trained model may be used to predict the labels of the test data.

Thus, the neural network may be trained from inputs having known labels or classifications to identify and classify those inputs.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for dynamic music creation comprising; a) assigning an emotion to one or more musical motifs; b) associating a game vector with the emotion; c) generating an event cue for a game having the game vector wherein the event cue includes upcoming events within the game; d) mapping the one or more musical motifs to the game vector based on the emotion; e) generating a musical composition based on the game vector and an expected emotion of at least one of the upcoming events in the event cue to create foreshadowing in the musical composition of upcoming events within the game.

2. The method of claim 1 wherein the emotion is assigned to the one or more musical motifs by a neural network trained to assign emotions to music based on content.

3. The method of claim 1 wherein a level is assigned to the emotion and the mapping of the one or more musical motifs to the game vector changes with the level assigned to the emotion.

4. The method of claim 3 wherein the level assigned to the emotion is changed using an emotion level slider.

5. The method of claim 1 further comprising associating a user behavior to the emotion and mapping the one or more musical motifs to the user behavior based on the emotion.

6. The method of claim 1 further comprising assignment of the one or more musical motifs to the emotion based on a physical response of a user to each of the one or more musical motifs.

7. The method of claim 1 further comprising assigning one of one or more motifs to a game vector as a default motif and wherein the default motif is included in the musical composition whenever the game vector is present within a videogame.

8. The method of claim 1, wherein the game vector includes a game element and a 2 trigger for the game element within a videogame.

9. The method of claim 8 further comprising assigning one of the one or more motifs to a game element as a default motif for the game element and including the default motif in the musical composition whenever the game element is present within the videogame.

10. The method of claim 8 further comprising assigning one of the one or more motifs to the trigger as a default motif for the trigger and including the default motif in the musical composition whenever the trigger is activated within the videogame.

11. The method of claim 1 wherein generating a musical composition comprises selecting one of the one or more musical motifs to play while a videogame is being played wherein the musical motifs are played contemporaneously with the videogame.

12. The method of claim 1 wherein the event cue includes an event probability, event timing, and an event emotional weight, wherein the event probability defines the likelihood an event will occur within the event timing and wherein the event emotional weight provides the emotion of the event.

13. The method of claim 1 wherein the event emotional weight includes a level for the emotion.

14. A system for dynamic music creation comprising; a processor; a memory coupled to the processor; non-transitory instructions embedded in the memory that when executed cause the processor to carry out the method comprising: a) assigning an emotion to one or more musical motifs; b) associating a game vector with the emotion; c) generating an event cue for a game having the game vector wherein the event cue includes upcoming events within the game; d) mapping one or more musical motifs to the game vector based on the emotion; e) generating a musical composition based on the game vector and an expected emotion of at least one of the upcoming events in the event cue to create foreshadowing in the musical composition of upcoming events within the game.

15. The system of claim 14 wherein the emotion is assigned to the one or more musical motifs by a neural network trained to assign emotions to music based on content.

16. The system of claim 14 wherein a level is assigned to the emotion and the mapping of the one or more musical motifs to the game vector changes with the level assigned to the emotion.

17. The system of claim 16 further comprising an emotion slider coupled to the processor wherein the emotion slider is configured to control the level assigned to the emotion.

18. The system of claim 14 further comprising assignment of the one or more musical motifs to the emotion based on a physical response of a user to each of the one or more musical motifs.

19. The system of claim 18 further comprising a biometric device coupled to the processor and configured to track the physical response of the user.

20. Non-transitory instructions embedded in a computer readable medium that when executed cause a computer to perform the method comprising; a) assigning an emotion to one or more musical motifs; b) associating a game vector with the emotion; c) generating an event cue for a game having the game vector wherein the event cue includes upcoming events within the game; d) mapping one or more musical motifs to the game vector based on the emotion; e) generating a musical composition based on the game vector and an expected emotion of at least one of the upcoming events in the event cue to create foreshadowing in the musical composition of upcoming events within the game.

\* \* \* \* \*